(12) United States Patent
Hackl

(10) Patent No.: US 6,386,645 B2
(45) Date of Patent: May 14, 2002

(54) METHOD FOR A CONTROLLED POWER ACTIVATION OF AN ELECTROMECHANICAL BRAKING SYSTEM IN A MOTOR VEHICLE

(75) Inventor: Stefan Hackl, Schwandorf (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/803,760

(22) Filed: Mar. 12, 2001

(30) Foreign Application Priority Data

Mar. 10, 2000 (DE) .......................... 100 11 634

(51) Int. Cl.[7] ................................ B60T 8/34
(52) U.S. Cl. ................. 303/3; 303/15; 303/20
(58) Field of Search .............. 303/3.15, 20, 113.1, 303/113.2, 155, 152

(56) References Cited

U.S. PATENT DOCUMENTS 5,749,633 A * 5/1998 Baumgartner ............ 303/113.2
6,256,570 B1 * 7/2001 Weiberle et al. ............... 303/15

FOREIGN PATENT DOCUMENTS

DE 42 14 547 A1 11/1993
DE 198 41 170 C1 2/2000

* cited by examiner

Primary Examiner—Matthew C. Graham
(74) Attorney, Agent, or Firm—Herbert L. Lerner; Laurence A. Greenberg; Werner H. Stemer

(57) ABSTRACT

A method for the controlled power activation of an electromechanical braking system in a motor vehicle where the maximum power available is less than the nominal capacity includes the step of activating brake force-generating units of the braking system individually or in subgroups in succession to one another. The brake force-generating units are in each case activated with a power level corresponding to a portion of the maximum power available. The portion of the maximum power available is sufficient for the individual unit to function at least partially.

7 Claims, 2 Drawing Sheets

METHOD FOR A CONTROLLED POWER ACTIVATION OF AN ELECTROMECHANICAL BRAKING SYSTEM IN A MOTOR VEHICLE

BACKGROUND OF THE INVENTION

Field of the Invention

The invention relates to a method for the controlled power activation of an electromechanical braking system in a motor vehicle in cases when the maximum power available is less than a nominal power capacity.

Modern motor vehicles are equipped with an ever-growing number of electronic systems in order to meet ever-increasing demands for active and passive safety, environmental compatibility and comfort. This applies particularly to the handling properties and ride qualities of a vehicle, which are increasingly influenced by intelligent electronic control systems through corresponding intervention in the engine and brake control. The antilock brake system, the traction control system or electronic stability programs are just some examples. The latter stabilize a vehicle when it swerves by using a selective wheel braking intervention.

However, such an external or forced electronic interventions in what have hitherto been hydraulic braking systems in order to implement the aforementioned safety concepts necessitate the use of a large number of additional components, such as valves, pumps and hydraulic accumulators, for example. This makes such braking systems extremely complex and difficult to regulate as far as the control engineering is concerned.

To solve this problem electromechanical braking systems have been developed in recent years, in which the brake forces acting on the wheel are generated by electromechanical transducers. These transducers are activated by way of a control system, which through the use of suitable sensors registers the pedal travel and/or pedal actuating pressure and activates the brakes accordingly. The control unit for the braking system may at the same time readily incorporate special functions, such as the above-mentioned ABS (Antilock Braking System), TCS (Traction Control System), various brake-assist functions or the electronic stability program (ESP), into the electromechanical braking system.

In summary, such a "brake-by-wire" system constitutes a power braking system, in which the driver, when braking, merely actuates a brake pedal simulator, the movement of which is in turn relayed, via sensors, to a superordinate control unit, the so-called "brake-by-wire manager."

Published, Non-Prosecuted German Patent Application No. DE 42 14 547 A1 discloses an electro-hydraulic vehicle braking system with a plurality of subsidiary braking systems. Each subsidiary braking system has, among other things, a pair of solenoid valves, in order either to interrupt the supply of brake actuating pressure to an actuating element or to interrupt the supply of brake actuating pressure to an actuating element and reduce the brake actuating pressure at the actuating element. In order to avoid inadmissibly high currents when operating the solenoid valves, the energizing of the solenoid valves of the various subsidiary systems is controlled in such a way that the current consumption of at least one solenoid valve is reduced in comparison to its peak current consumption, before the peak current consumption of at least one other solenoid valve occurs.

German Patent No. DE 198 41 170 C1 discloses a method for the economical use of the electrical power needed by an electrically actuatable brake actuator, in which, during a braking operation, the brake actuator is only supplied with the full current necessary for activation if the brake application force is to be adjusted due to an adjustment of the braking demand. If, on the other hand, the braking demand is not adjusted, the brake actuator is only subjected to a reduced current necessary for maintaining the static brake application force required.

Since the braking system is a vehicle system of extreme relevance to safety, the safety concept, the reliability and the monitoring of the braking system are of central importance. In this respect a control computer generally monitors the "brake-by-wire manager," the individual electromechanical transducers, the bus system linking these components and the various sensors involved in the system. Through the use of plausibility criteria and test routines incorporated into the control and monitoring program, fault conditions can be detected, localized and diagnosed. Corresponding emergency functions can be activated as a function of the fault condition, in order to keep the braking system in the most reliable operating condition possible.

The supply of power to the electromechanical brake system, which is a task that has to be performed by the electrical system of the vehicle, constitutes a particular problem in the context of fault conditions. In critical operating conditions, in the event of malfunctions of the vehicle alternator, for example, the maximum electrical power available may be only a certain fraction of the nominal capacity—i.e. the power output for a normal operation without any malfunction. The electromechanical brake force-generating units might therefore be no longer able to supply the necessary brake forces.

SUMMARY OF THE INVENTION

It is accordingly an object of the invention to provide a method for a controlled power activation of an electromechanical braking system which overcomes the above-mentioned disadvantages of the heretofore-known methods of this general type and which provides a sufficient braking force even when the available power is less than the nominal power capacity.

For safety reasons, the brake forces achievable must approximate as closely as possible to the specified maximum brake force in as many system conditions as possible—that is to say even in the event of a fault with reduced power available.

With the foregoing and other objects in view there is provided, in accordance with the invention, a method for a controlled power activation of an electromechanical braking system in a motor vehicle, the method includes the steps of:
providing, in a motor vehicle, an electromechanical braking system having brake force-generating brake units activateable in subgroups, the subgroups respectively including at least one of the brake force-generating brake units;
sequentially activating the subgroups of the brake force-generating brake units if an available maximum power is below a nominal power capacity, and activating the brake force-generating brake units of the subgroups in each case with a given portion of the available maximum power such that the given portion of the available maximum power is sufficient for the brake force-generating brake units of the subgroups to function at least partially;
adjusting each of the brake force-generating brake units of the subgroups to a first power level for an activation of the brake force-generating brake units of the subgroups; and
subsequently supplying each of the brake force-generating brake units of the subgroups with a second power level smaller than the first power level for maintaining a brake force.

In other words, the invention provides a method for the controlled power activation of electromechanical braking systems in motor vehicles where the maximum power available is less than the nominal capacity, the brake force-generating brake units of the braking system being activated individually or in subgroups in succession to one another, in each case with a power level representing a portion of the maximum power available sufficient for the individual unit to function at least partially, and each brake unit being adjusted to an increased power level for activation thereof and then supplied with a reduced power level, which maintains the brake force.

The invention proposes to activate the brake force-generating units of the braking system in each case with a portion of the maximum power available sufficient for the individual unit to function. The maximum power available is therefore, figuratively speaking, distributed intelligently throughout the braking system. The control method according to the invention does this by making use of a special characteristic of electromechanical braking systems, namely the fact that maintaining a certain brake force once the respective brake force-generating unit has been activated requires substantially less energy than the initial build-up of brake force. This is due to the hysteresis effects occurring in any mechanical system in motion. These hysteresis effects are caused, among other things, by friction.

By utilizing this effect in a preferred mode of the controlled power activation method, each brake force-generating unit can be adjusted to an increased power level for its activation and then supplied with a reduced brake force-maintaining power level. Should the mechanical friction present in the system not suffice after adjusting the respective unit, a mechanical locking device, such as an electrically activated friction cone or the like, can be activated to assist in maintaining the brake force.

For driving safety reasons it is preferable, if subgroups of brake units are jointly activated, to select those brake units respectively assigned to each chassis axle. The brake units are therefore adjusted symmetrically, taking the two brake units on the front axle first, for example, followed by the brake units on the rear axle.

In other words, given ones of the brake force-generating brake units assigned to a given chassis axle are selected as one of the subgroups; and the given ones of the brake force-generating brake units are jointly activated.

More specifically, a first group of the brake force-generating brake units assigned to a first chassis axle is selected as a first one of the subgroups, and a second group of the brake force-generating brake units assigned to a second chassis axle is selected as a second one of the subgroups. The first group of the brake force-generating brake units is jointly activated and the second group of the brake force-generating brake units is jointly activated.

Finally, in implementing the method according to the invention, a predetermined maximum value is advantageously to be observed for the difference in brake force between the individual brake units, particularly in the case of asymmetrical activation of brake units. The difference in the brake forces set on the individual brake units must not exceed a certain "brake pull limit," since otherwise the vehicle condition may become unstable, when the vehicle pulls to one side for example.

In other words, the brake force-generating brake units are activated such that a given maximum value for a difference in brake force between individual ones of the brake force-generating brake units is not exceeded.

According to a specific mode of the invention, the brake force-generating brake units are activated such that a given maximum value for a difference in brake force between a left-hand one of the brake force-generating brake units of a chassis axle and a right-hand one of the brake force-generating brake units of the chassis axle is not exceeded.

Other features which are considered as characteristic for the invention are set forth in the appended claims.

Although the invention is illustrated and described herein as embodied in a method for the controlled power activation of electromechanical braking systems in motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
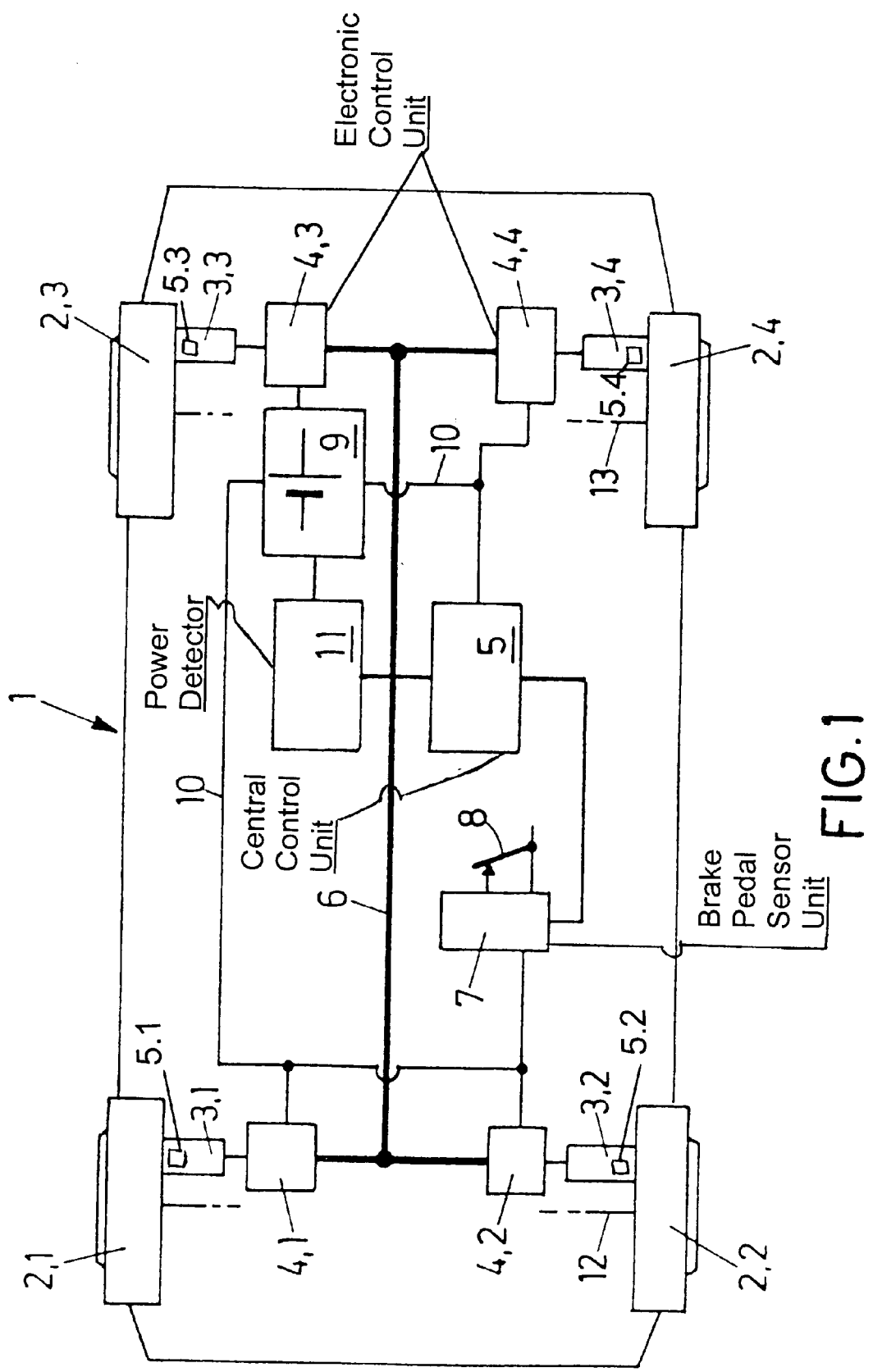
FIG. 1 is a schematic view of a vehicle with an electromechanical braking system.

Referring now to the figures of the drawings in detail and first, particularly, to FIG. 1 thereof, there is shown a plan layout view of a motor vehicle 1 with its four wheels 2.1, 2.2, 2.3, and 2.4. Each wheel 2.1 to 2.4 is provided with a brake force-generating unit in the form of an electromechanical transducer 3.1 to 3.4, which when appropriately activated is capable of generating a high brake force on the respective wheel 2.1 to 2.4 within a tenth of a second. For activation of the electromechanical transducers 3.1 to 3.4 these are each provided with an electronic control unit 4.1 to 4.4 respectively.

Here, the core of the electromechanical braking system in the vehicle 1 is a central control unit 5, which is on the one hand connected by way of a CAN (Controller Area Network) bus 6 to the control units 4.1 to 4.4 of the individual electromechanical transducers 3.1 to 3.4. On the other hand the control unit 5 is coupled to a brake pedal sensor unit 7, which registers the travel and/or the actuation force of the brake pedal 8 and converts this into corresponding electrical signals.

In addition a power supply 9 is provided in the form of the vehicle electrical system battery, which is responsible for supplying current to the individual components. This is indicated by the network of current supply leads 10. A power detector 11, which can register the maximum power deliverable by the power supply 9, is assigned to the current source. A corresponding signal is fed to the control unit 5.

Figure 2:
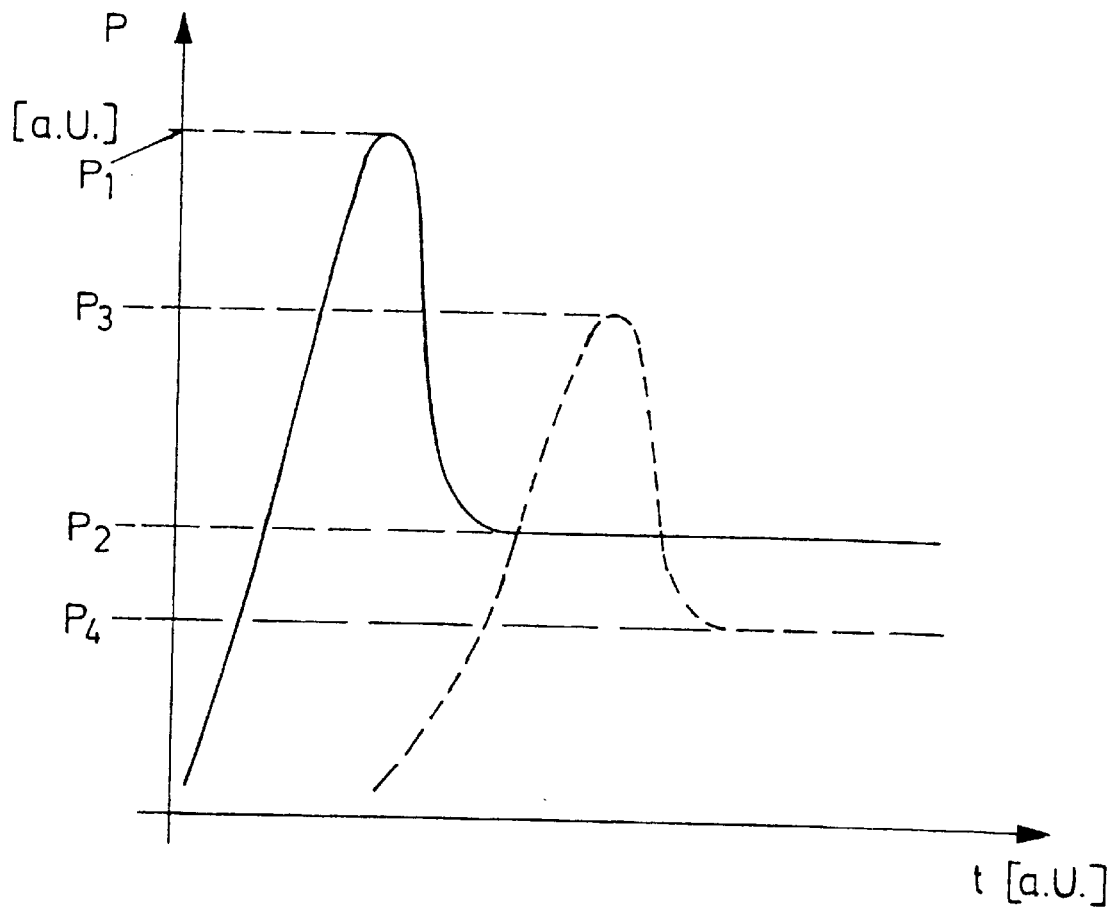
FIG. 2 is a qualitative time-power diagram of the successive power adjustment of the brake units on a front axle and a rear axle of the vehicle according to FIG. 1.

If the power detector 11 now detects that the maximum power delivered by the power supply 9 is clearly below the nominal capacity, the control unit 5, in response to pressure on the brake pedal 8, does not activate all four transducers 3.1 to 3.4 either simultaneously or with equal power. Instead a transient, quantitative distribution is performed. FIG. 2 is an exemplary time-power graph with the power P and time t indicated only in arbitrary units (a.u.) and provides a rough, qualitative idea of the above-mentioned distribution. Thus the two transducers 3.1, 3.2 on the front wheels 2.1, 2.2 are activated first with a predetermined maximum power $P_1$, which provides for the build-up of a predetermined brake force on the two front wheels 2.1, 2.2. Thereafter the power can be reduced to a value $P_2$ since, following the actual build-up of brake force, the brake force can be maintained by a reduced power output. After the power level $P_2$ has been attained on the two transducers 3.1, 3.2 on the front wheels 2.1, 2.2, the control unit 5 adjusts the electromechanical transducers 3.3, 3.4 on the rear axle 13. This is done with a lower power level $P_3$ than the power level $P_1$, since a certain proportion of the power must be kept available for maintaining the brake force on the front axle 12.

In the same way as for the front wheels 2.1, 2.2, the brake power on the rear wheels 2.2, 2.4 is then reduced by lowering the power level to $P_4$, since this power level is sufficient to maintain the brake force on the rear wheels.

Each brake force-generating unit can be adjusted to an increased power level for its activation and then supplied with a reduced brake force-maintaining power level. Should the mechanical friction present in the system not suffice after adjusting the respective unit, a mechanical locking device 5.1, 5.2, 5.3, 5.4, such as an electrically activated friction cone or the like, can be activated to assist in maintaining the brake force.

With reference to the diagram in FIG. 2, it is further pointed out that an asymmetry in the power control—especially where individual transducers 3.1 to 3.4 are activated independently of the other transducers—must not be too high, in order to avoid unstable vehicle conditions.

I claim:

1. A method for a controlled power activation of an electromechanical braking system in a motor vehicle, the method which comprises:

providing, in a motor vehicle, an electromechanical braking system having brake force-generating brake units activateable in subgroups, the subgroups respectively including at least one of the brake force-generating brake units;

sequentially activating the subgroups of the brake force-generating brake units if an available maximum power is below a nominal power capacity, and activating the brake force-generating brake units of the subgroups in each case with a given portion of the available maximum power such that the given portion of the available maximum power is sufficient for the brake force-generating brake units of the subgroups to function at least partially;

adjusting each of the brake force-generating brake units of the subgroups to a first power level for an activation of the brake force-generating brake units of the subgroups; and subsequently supplying each of the brake force-generating brake units of the subgroups with a second power level smaller than the first power level for maintaining a brake force.

2. The method according to claim 1, which comprises activating a mechanical locking device for assisting in maintaining the brake force, subsequent to the step of adjusting each of the brake force-generating brake units of the subgroups.

3. The method according to claim 1, which comprises activating a mechanical locking device for assisting in maintaining the brake force, subsequent to the step of supplying each of the brake force-generating brake units of the subgroups with the second power level.

4. The method according to claim 1, which comprises:

selecting given ones of the brake force-generating brake units assigned to a given chassis axle as one of the subgroups; and jointly activating the given ones of the brake force-generating brake units.

5. The method according to claim 1, which comprises:

selecting a first group of the brake force-generating brake units assigned to a first chassis axle as a first one of the subgroups; and selecting a second group of the brake force-generating brake units assigned to a second chassis axle as a second one of the subgroups; and jointly activating the first group of the brake force-generating brake units; and jointly activating the second group of the brake force-generating brake units.

6. The method according to claim 1, which comprises activating the brake force-generating brake units such that a given maximum value for a difference in brake force between individual ones of the brake force-generating brake units is not exceeded.

7. The method according to claim 1, which comprises activating the brake force-generating brake units such that a given maximum value for a difference in brake force between a left-hand one of the brake force-generating brake units of a chassis axle and a right-hand one of the brake force-generating brake units of the chassis axle is not exceeded.

* * * * *